INVENTOR.
Otto M. Springer
BY
Michael J. Striker

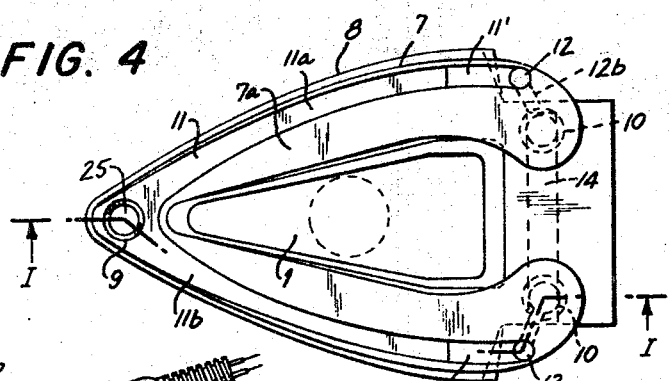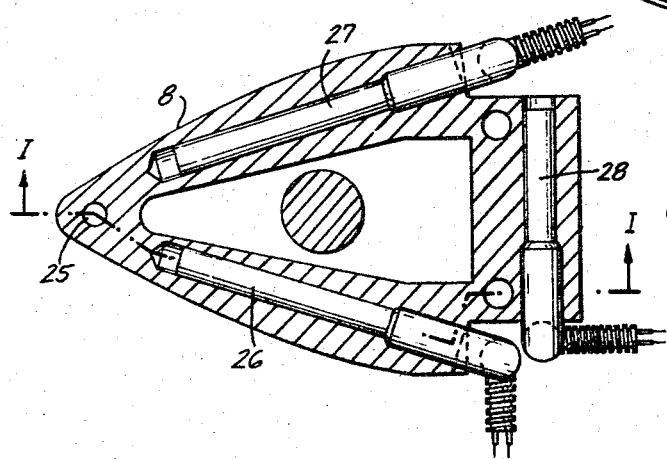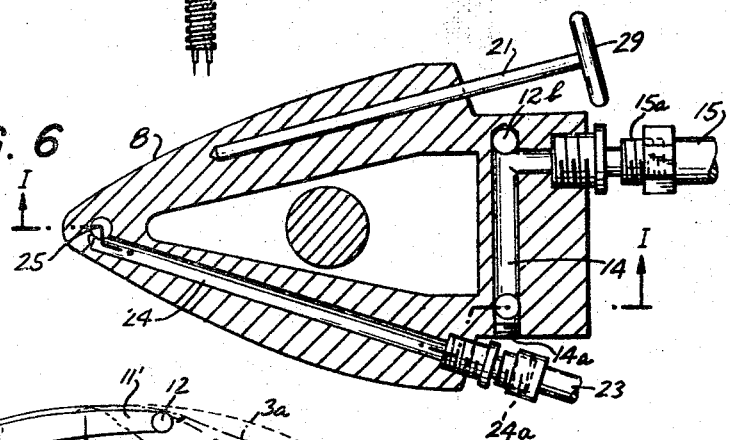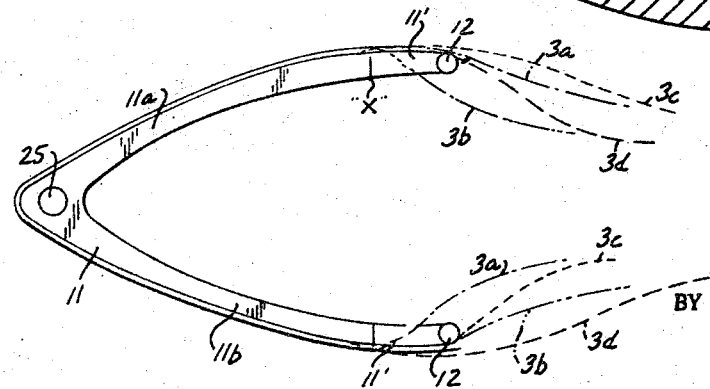

May 17, 1966  O. M. SPRINGER  3,251,081
APPARATUS FOR APPLYING ADHESIVE

Filed Dec. 30, 1963  4 Sheets-Sheet 4

INVENTOR.
Otto M. Springer
BY
Richard J. Striker
Atty.

United States Patent Office 3,251,081
Patented May 17, 1966

3,251,081
APPARATUS FOR APPLYING ADHESIVE
Otto M. Springer, Bayside, N.Y., assignor to Independent Shoe Machinery Company Inc., New York, N.Y.
Filed Dec. 30, 1963, Ser. No. 334,450
24 Claims. (Cl. 12—10.1)

The present invention relates to an apparatus for applying an adhesive, and more particularly to an apparatus for applying an adhesive to the insole supported on a last in a shoe lasting machine. In machines of this type, the marginal portion of the material forming the upper of the shoe is wiped over the margin of the insole, and bonded to the same.

The U.S. Patent No. 3,039,121 discloses a lasting machine provided with means for spraying an adhesive onto the margin of the insole and of the upper before the margin of the upper is wiped in. This apparatus has certain disadvantages, inasmuch as it is not possible to achieve perfect distribution of the adhesive. Furthermore, certain thermoplastic adhesives, which are particularly well suited for the purpose, cannot be used in the spraying arrangement of this patent.

It is one object of the present invention to overcome these disadvantages, and to provide an apparatus for applying adhesive which achieves automatic application of the adhesive to well defined surface portions of a material, and a uniform distribution of the adhesive over the areas to which it is applied.

Another object of the invention is to provide an apparatus for applying adhesive to the marginal portion of an insole supported on the bottom face of the last in a lasting machine.

Another object of the invention is to provide an apparatus for applying an adhesive in a lasting machine in such a manner that no part of the adhesive is applied to undesired areas.

Another object of the invention is to provide an apparatus for applying an adhesive under pressure to limited areas of a material.

Another object of the invention is to provide an apparatus causing the flow of an adhesive along surfaces to be provided with an adhesive coating.

Another object of the invention is to pump an adhesive in such a manner that it first flows along a surface to which it partly adheres, whereupon the surplus of the adhesive is returned to the pump.

With these objects in view, the present invention relates to an apparatus for applying an adhesive to a material, particularly to an insole supported on a last in a lasting machine which is provided with pincers for pulling the upper of a shoe, and with wipers for wiping in the marginal portion of the upper over the marginal portion of the insole.

One embodiment of the invention comprises means for supporting a material, for example an insole; applicator means having an open channel, preferably having a shape conforming to the peripheral contour of the insole; and means for moving an adhesive through the channel while the applicator means is in an operative position abutting the material in such a manner that the open channel is closed by the material. The flowing adhesive partly adheres to the material along the areas closing the channel, and when the applicator means is retracted from the material to an inoperative position, the material can be adhesively connected to another material.

In a lasting machine according to the invention, where the adhesive is applied along the peripheral outline of an insole by a correspondingly shaped channel, the upper is pulled over the last, the applicator means are retracted from the insole, and the margin of the upper wiped over the marginal portion of the insole provided with the adhesive.

In the preferred embodiment of the invention, the channel has a constricted portion near its outlet end so that high pressure developed in the channel whereby the adhesive is pressed into the pores of the insole, which results in a particularly reliable adhesive connection after the margin of the upper has been wiped in.

A polyester type adhesive with a melting point around 400° F. has been found particularly suitable due to its short setting time which directly increases the production capacity of the machine.

It is advantageous to provide heating means in the applicator means for heating the same and thereby the adhesive in the channel, and also in the inlet and outlet passages of the applicator means.

Since the applicator means are movable between a position abutting the insole and the last, and a retracted position, flexible hoses connect the inlet and outlet of the channel with the pump by which the adhesive is pumped through the channel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is a plan view of the apparatus shown in FIG. 1, with the last and insole omitted;

FIG. 5 is a sectional view taken on line V—V in FIG. 1;

FIG. 6 is a sectional view taken on line VI—VI in FIG. 1;

FIG. 7 is a schematic top plan view illustrating the channel for the adhesive and the outlines of insoles of various sizes and shapes;

Figure 1:
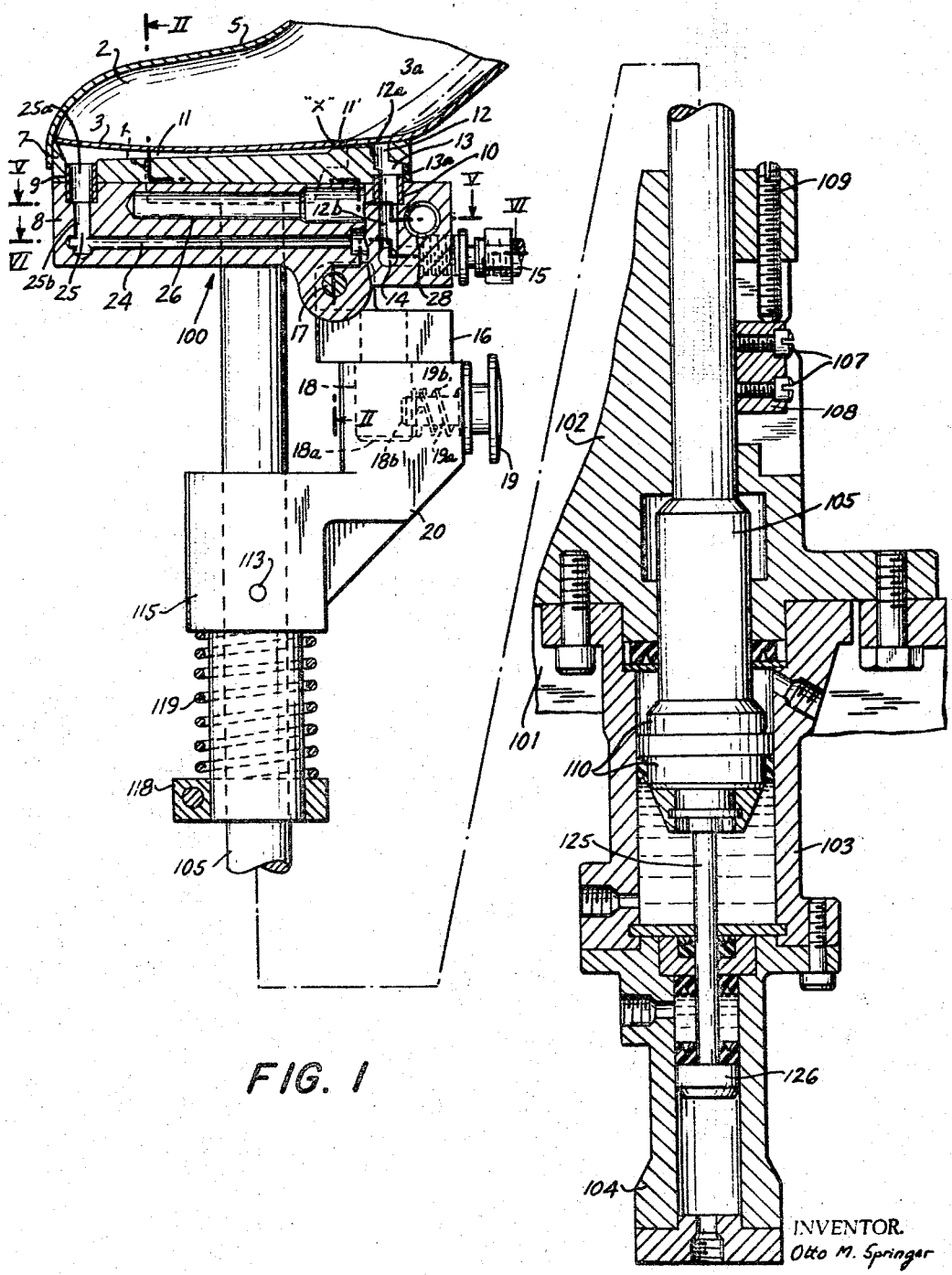
FIG. 1 is a fragmentary side view, partially in section along lines I—I in FIGS. 4, 5 and 6.
Figure 2:
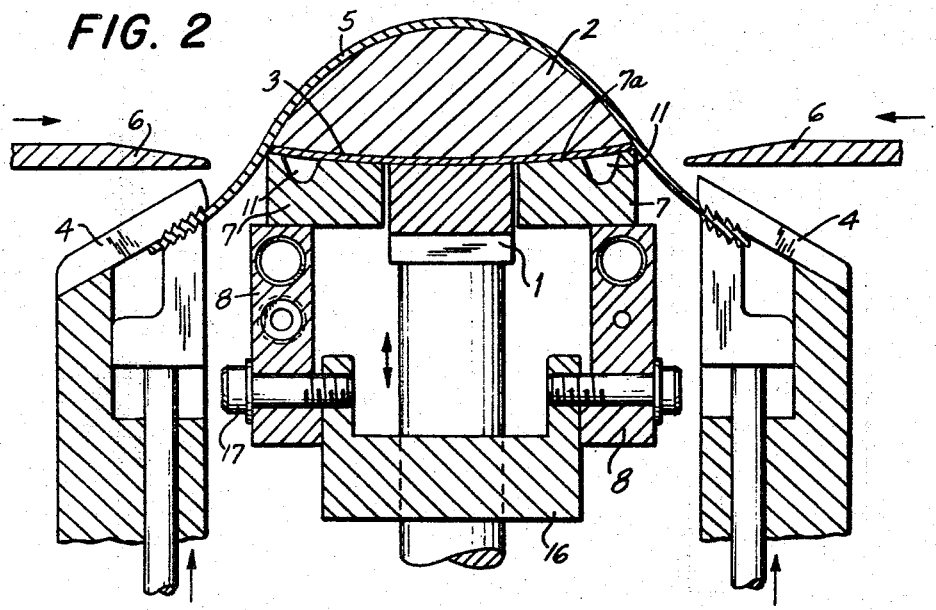
FIG. 2 is a cross-sectional view taken along lines II—II in FIG. 1.

Referring now to the drawings, and more particularly to FIGS. 1, 2, and 4, a last support 1 of substantially triangular shape is supported on a vertical hollow rod 105 whose lower end has a piston portion 110 located in a cylinder 103 so that the last support 1 can be raised and lowered.

A sleeve 115 is mounted on the hollow rod 105 and carries a bracket 20. A spring 119 abuts a clamping ring 118 fixed to rod 5 and urges sleeve 115 with bracket 20 upward. An inner rod 125 is shiftable within rod 105 and has a lower end provided with a piston 126 located in a cylinder 124. The upper end of rod 125 carries a transverse pin 113 which is guided in corresponding slots of the hollow rod 105 and whose ends project into corresponding bores of sleeve 115 so that by operation of piston 126, sleeve 115 and bracket 20 can be lowered against the action of spring 119. Rod 105 is guided in a bearing portion 102 secured to frame 101 of the machine. A block 108 is secured to piston rod 105 by screws 107 and is slidably received in a vertical slot formed in the bearing portion 102 so that rotation of rod 105 is prevented. A stop screw 109 limits the extent of the upward travel of rod 105.

The above described hydraulic operating means is described in detail in the U.S. Patent 3,039,121, and may be modified in such a manner that the spring 119 is omitted and the piston 126 used for moving the sleeve 115 with bracket 120 between a higher position and a lower position if the pressure provided by spring 119 is considered insufficient.

Applicator means 100 are mounted on bracket 20 for movement therewith and include an upper applicator part 7, a lower applicator part 8, and first horizontal pivot means including two threaded studs 17, best seen in FIG. 2, passing through the lower applicator part 8 and secured to a mounting member 16 which has a second vertical pivot means in the form of a stud 18 projecting into a corresponding bore 18a of bracket 20 and provided with a transverse bore 18b into which a locking pin 19a of a locking member 19 normally projects. Locking member 19 can be manually withdrawn against the action of spring 19b so that it is possible to detach the applicator means 100 with pivot means 17 and mounting member 16, 18 from bracket 20.

Figure 3A:
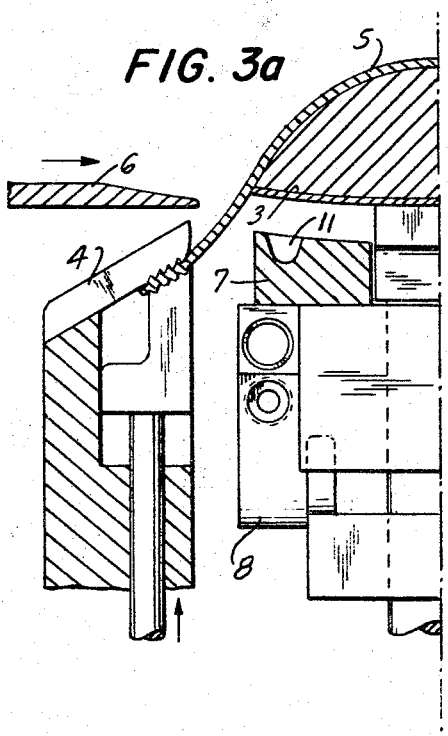
FIG. 3a is a fragmentary cross-sectional view corresponding to one-half of FIG. 2, and illustrating another operational position of the apparatus.
Figure 3B:
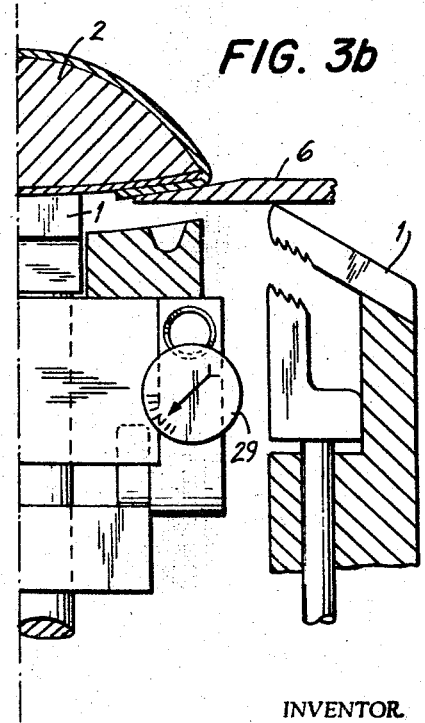
FIG. 3b is a fragmentary cross-sectional view illustrating the other half of the apparatus in a further operational position.

The horizontal screws 17 permit an angular adjustment of the applicator members 7 and 8 about a horizontal axis. The above described arrangement is provided in a lasting machine which includes a pair of pincers 4, and a pair of wipers 6 as best seen in FIGS. 2, 3a, and 3b. The construction of this type of machine is well known, and consequently the means by which the wipers 6 and the pincers 4 are operated, are not shown in the drawing.

A machine of this type is used for pulling a sheet material 5, forming the so-called "upper" of a shoe over the last 2 while an insole 3 is located on the bottom face of the last 2 and pressed against the same by the last support 1. By operation of the hydraulic piston 110, the last support 1 is pressed upwardly while pincers 4 hold the margin of the upper whereby the upper is stretched and pulled down over the last 2 whereupon the pincers 4 are simultaneously opened, as shown in FIG. 3b, while the wipers 6 are caused to move inwardly to wipe the margin of the upper over the margin of the insole 3.

In accordance with the present invention, an adhesive is applied to the margin of the insole 3 before the wiping operation so that after the wiping operation, the margin of the uppers is adhesively attached to the margin of the insole.

FIG. 1 shows the machine in a position in which the last support 1 has been placed in such a relative position with respect to pincers 4 that the upper 5 gripped by the pincers has been pulled over the last. At the moment illustrated in FIG. 1, the wipers have not yet moved inward.

In accordance with the present invention, last support 1 is surrounded by the applicator parts 7 and 8 which have corresponding triangular cutouts as best seen in FIGS. 4, 5 and 6. The applicator member comprising applicator parts 7 and 8 has two functions. During the pulling of the upper it is held by spring 119 in the position illustrated in FIGS. 1 and 2 in which the top face 7a of the upper applicator member 7 abuts the insole 3 and presses the same against the bottom face of last 2. The outer peripheral edge of top face 7a of applicator part 7 has the same outline and contour as the outer edges of the insole 3 and of the bottom face of last 3 so that the edge of the insole is clamped. Directly before the inward movement of wipers 6, piston 126 causes downward movement of sleeve 115, bracket 20, and applicator means 100 to the inoperative retracted position shown in FIG. 3a so that the wipers 6 can move inwardly to the position shown in FIG. 3b after pincers 4 have been opened to release the margin of the upper. It will be understood that both pincers and wipers operate simultaneously and that FIGS. 3a and 3b show only one-half of the arrangement, a symmetrical half being omitted for the sake of simplicity.

The upper applicator part 7 in the position of FIG. 2, temporarily holds the margin of the insole so that the same cannot curl away from the last and proper wiping of the margin of the upper over the insole is assured.

The main function of the applicator means 100 according to the present invention is the application of an adhesive to the margin of the insole before the wiping takes place.

The top face 7a of applicator part 7 has a three-dimensional curvature matching the three-dimensional curvature of the bottom face of last 2. Since the outer peripheral contour of applicator part 7 corresponds to the peripheral contour of the bottom face of the last and of the insole. The top face 7a of the applicator part 7 fully abuts the insole 3 in the operative position shown in FIGS. 1 and 2. An adjustment of the position may be carried out by turning the applicator 100 about the horizontal axis of the pivot means 17.

As best seen in FIGS. 1 and 4, the engaging top face 7a of the upper applicator part 7 is provided with an open channel 11 which is substantially parallel to the lateral contour of applicator part 7 and of the insole. The open channel 11 includes two channel portions 11a and 11b which have one pair of adjacent and communicating ends in the region of the pointed tip of the applicator, and another pair of ends transversely spaced from each other and located in the region of the ball portion of the insole and last.

An inlet passage 25 includes an inlet passage portion 25a in the upper applicator part 7, and a lower inlet passage portion 25b in the lower applicator part 8. Inlet passage 25 communicates with the forward ends of channel portions 11a and 11b, and is also connected to a horizontal inlet duct 24 which terminates in inlet means 24a attached to a flexible hose 23; as best seen in FIG. 6. At the other ends of the channel portions 11a and 11b, a pair of outlet passages 12 is provided, each outlet passage 12 including an upper portion 12a located in the upper applicator part 7, and a lower portion 12b located in the lower applicator part 8. A transverse drainage passage 14 is provided in the lower applicator part 8 and connected at opposite ends thereof to the lower ends of the lower outlet passage portions 12b. A drainage outlet 13 in the upper applicator part 7 is closed by a plug 13a. The transverse drainage passage 14 is closed by a plug 14a. The other end of passage 14 is connected to an outlet means 15a which is attached to a flexible discharge hose 15.

An adhesive entering through inlet hose 23, ducts 24, and inlet passage 25 into the apex of the V-shaped open channel 11 will flow through channel portions 11a and 11b and be discharged through outlet passages 12, transverse drainage passage 14, and discharge hose 15. As explained above, channel 11 is open on top, but in the operative position of the applicator means 100 illustrated in FIGS. 1 and 2, the open channel 11 is closed by insole 3 so that the adhesive partly adheres to the marginal portion of insole 3, and is partly discharged through the outlet passages and discharge hose 15.

The rear end portions 11' of channel portions 11a and 11b are constricted and have a smaller depth than the remainder of channel portions 11a and 11b. The cross section of each channel portion 11a and 11b gradually decreases from the inlet passage 25 toward the constricted portions 11'. Consequently, when an adhesive is pressed through inlet passage 25 into channel portions 11a and 11b, high pressure will be built up in the channel since the flow of adhesive is throttled in the constricted por- In order to adapt the applicator to insoles and lasts of different shape, the upper applicator part 7 is detachable and exchangeable so that a suitable applicator part 7 can be provided for each last used on the machine.

A tubular member 9 is permanently secured to a corresponding portion of the inlet passage 25b, for example by a press fit, and projects into inlet passage portion 25a with a sliding fit. A pair of tubular members 10 are permanently secured to the outlet passage portions 12a in the upper applicator member 7 and project with a slide fit into corresponding portions of the outlet passage portions 12b in the lower applicator member 8. Consequently, the upper applicator member 7 can be exchanged, while the upper and lower inlet and outlet passage portions will be in perfect alignment and register for each different applicator part 7.

As previously mentioned, the entire applicator 100 with the mounting member 16 can be removed from bracket 20, and exchanged for another applicator when operations on a last of extremely different size and shape is intended.

It is preferred to heat the adhesive flowing through channel 11 in order to obtain a desired viscosity which is particularly suitable for the application of the adhesive to the insole. Electrical heaters which may be of conventional construction including a carrier body, an electric resistance wire, and a suitable outer insulating cover, are mounted in the upper portion of the lower applicator part 8. Heating members 26 and 27 extend substantially parallel to the two channel portions 11a and 11b to heat the same along the length thereof, and a third heating member 28 extends parallel to the drainage passage 14 to heat the adhesive discharged through the outlet passages and through the transverse passage 14 into the discharge hose 15 which, as well as inlet hose 23, is preferably also heated by electric heating means, not shown.

The heating members 26, 27, 28 are so dimensioned that the outlet passages are held at a higher temperature than the inlet passages which facilitates the drainage flow which is preferably controlled only by gravity so that a lower viscosity of the adhesive is desirable.

A means for measuring the temperature is provided in the same plane of the lower applicator part 8, and is shown to be a thermometer 21 provided with an indicating dial 29, as best seen in FIGS. 6 and 3b. Instead of thermometer 29, the bulb of a thermostat may be placed in a corresponding cavity of applicator part 8, and the heating units 26, 27, 28 controlled in a well known manner by the thermostat to maintain a desired temperature of the applicator parts, and thereby of the adhesive so that a desired viscosity of the adhesive is assured. In the illustrated embodiment, the heat output of the heating members 26, 27, 28 may be manually adjusted by a suitable rheostat in accordance with the indication on the dial 29 of the thermometer.

Figure 8:
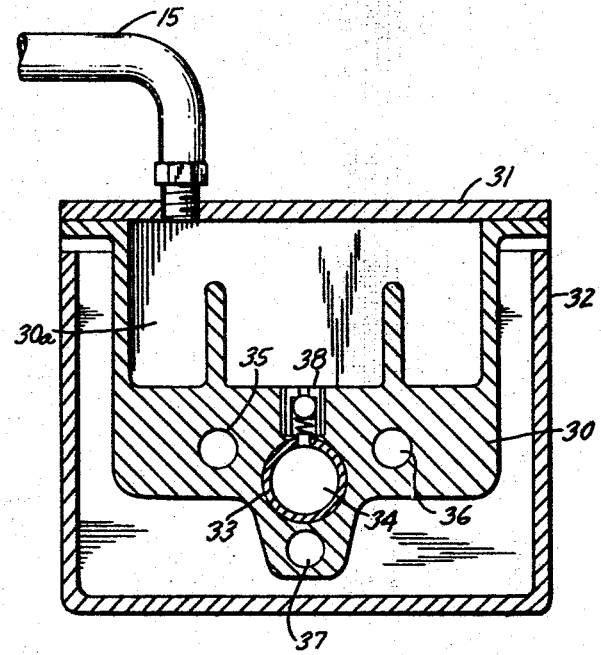
FIG. 8 is a vertical sectional view taken on line VIII—VIII in FIG. 9 and illustrating a pump for the adhesive.
Figure 9:
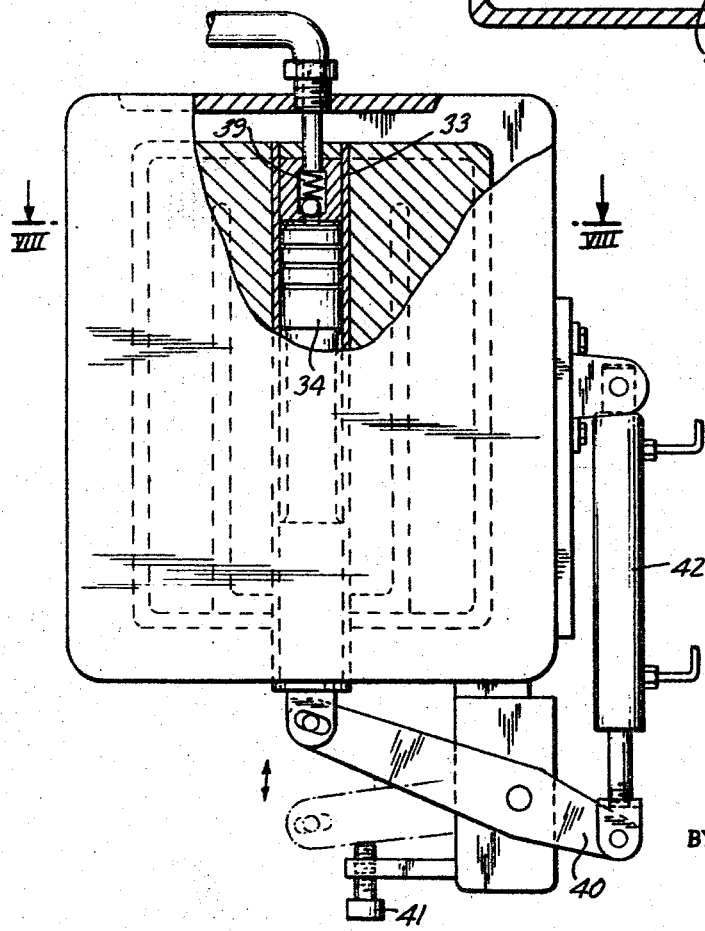
FIG. 9 is a plan view illustrating the pump of FIG. 8, partially in section.

As best seen in FIGS. 8 and 9, the discharge hose 15 is connected to the removable cover 31 of a casing 32 enveloping an injection pump. A container 30 is secured to cover 31 by suitable means, not shown, and insulated by thermo insulating material located within casing 32. Electric heating means 35 and 36 are provided for maintaining an adhesive located in the interior 30a of body 30 at a desired viscosity. The thick bottom of body 30 is provided with a pump cylinder 33 in which a piston 34 is mounted for reciprocating movement. The end of piston 34 is connected to a double-armed lever 40 which is reciprocated by a hydraulic motor 42 so that injection piston 34 is also reciprocated in cylinder 33. The stroke of lever 40 can be limited in the position illustrated in broken lines by an adjustable stop screw 41.

The molten adhesive in chamber 30a enters pump cylinder 33 through a check valve 38 during the suction stroke of piston 34, and is pressed into the inlet hose 23 through a check valve 39 during the forward pressure stroke of piston 34.

The above described apparatus for applying adhesive to an insole before the wiping in of the margin of the upper, operates in the following manner:

A last 2 with an insole 3 at the bottom face thereof, is placed on the top face of the last support 1. An upper 5 is placed on the last, and its marginal portion inserted into pincers 4 in the position shown in FIGS. 1 and 2. Wipers 6 are in the retracted position shown in FIG. 2.

An applicator 100 has been selected which generally corresponds to the last used for the respective operation, and has been placed on bracket 20 by means of stud 18a and locking member 19. An upper applicator member 7 having an upper engaging top face 7a exactly corresponding to the three-dimensional curvature of the bottom face of last 3 is selected and placed on the lower applicator part 8 by means of tubular members 9 and 10. If necessary, screws 17 are loosened, applicator 100 turned slightly, and screws 17 secured again so that the open channel or groove 11 is tightly closed by the insole. Spring 119 urges bracket 20 with applicator parts 8 and 7 to a position in which the engaging top face 7a abuts the insole 3 which is supported by the rigidly held last 2.

As shown in FIG. 7, insoles of different shape and size will cover the open channel 11 differently. The smallest size of a right insole 3a, the smallest size of a left insole 3b, the largest size of a right insole 3c, and the largest size of a left insole 3d are indicated in FIG. 7 by chain lines. An insole of smallest size is also indicated in chain lines in FIG. 1.

As is best seen in FIG. 7, the insoles of small size leave rearward parts of the narrower constricted channel portions 11' uncovered and the adhesive drains through the respective open channel portion into outlet passages 12. Reference point X indicates the foremost point of the constricted channel portions 11'. The foremost parts of the constricted channel portions 11' directly rearwardly of points X are covered by even the smallest insole to provide a constriction by which the pressure of the adhesive in channels 11a and 11b is increased. Larger insoles cover to an increasing extent the shallow channel portions 11' so that the ball portions of the larger insoles are also covered with the adhesive.

The adhesive is stored in heated condition in chamber 30a of the injection pump, and when the injection pump is operated, the piston 34 moving forwardly presses the adhesive through the preferably heated hose 23 into the inlet means 24a, through inlet passage 24 and 25, into the forward ends of channel portions 11a, 11b which are closed by the insole. The pressure of the pump moves the adhesive into channel portions 11a and 11b, and due to the provision of the constricted portions 11', substantial presure develops in the channel so that the adhesive is pressed against and into the pores of insole and adheres to the same 3.

The temperature, and thereby the viscosity, of the adhesive is controlled in accordance with the indication of the thermometer 21, 29.

The part of the adhesive which flows through channel portions 11a, 11b, and 11' into outlet passages 12 is discharged into drainage passage 14 which is heated to a higher temperature by electric heating member 28 so that the adhesive assumes a lower viscosity and freely flows by the action of gravity through the preferably heated outlet hose 15, which is also of wider cross section, into the chamber 30a of the injection pump.

The quantity of the adhesive adhering to the insole depends on the shape of channel 11, and on the temperature and viscosity of the adhesive. A lower temperature of the adhesive in channel 11 will result in higher viscosity, and in an increased thickness of the adhesive coating applied to the marginal portion of the insole. Consequently, the amount of adhesive adhering to the insole can be regulated by adjusting the electric heating means 26 and 27 since the viscosity of the adhesive in channel portions 11a and 11b depends on the heat produced by heating means 26 and 27.

The amount of adhesive pressed during each pumping stroke of piston 34 into channel 11 is greater than the amount of adhesive adhering to the insole and any surplus of the adhesive is drained back into the pump chamber 30a. After the marginal portion of the insole 3 has been covered with the adhesive, the hydraulic motor 104, 126 is operated to lower the applicator means 100 to the position illustrated in FIGS. 3a and 3b. While last support 1 urges last 2 with insole 3 upward so that the upper is tensioned by pincers 4, wipers 6 start the inward wiping movement whereupon pincers 4 open in the position of FIG. 3b and the margin of the upper 5 is wiped over the insole margin which was covered with adhesive during the proceeding operation. Consequently, the margin of the upper is adhesively connected to the margin of the insole.

The suction stroke of piston 34 takes place at any time between the completion of the wiping operation, and the beginning of the next following injection stroke for pumping adhesive into channel 11. Preferably, the suction stroke of piston 34 is carried out at the same time as the opening movement of the machine at the completion of the wiping operation.

Adjusting means for adjusting the inclination and height of last support 1 may be provided, but are not shown in the drawing since such adjustments are of a conventional nature.

While the operation has been described with reference to the application of an adhesive to an insole, it will be understood that the adhesive can be applied to other material and to other parts of a shoe.

It will be understood that each of the elements described above, or two or more together, may also find a useful application in other types of apparatus for applying an adhesive differing from the types described above.

While the invention has been illustrated and described as embodied in an apparatus for pumping an adhesive into an open channel closed by an insole, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a lasting machine for adhesively connecting parts of a shoe, in combination, support means for supporting a last and a material on said last; applicator means having an engaging face formed with an open channel, said channel having at least one constricted portion having a smaller cross-section than another portion of said channel; means mounting said applicator means for movement between an operative position in which said engaging face abuts the material so that said channel is closed by the material, and an inoperative position spaced from said support means and from the material; and means connected to said other portion of said channel for moving an adhesive first through said other portion and then through said constricted portion of said channel in said operative position of said applicator means whereby high pressure develops in said other portion of said channel so that a part of said adhesive adheres to the material when said applicator means is in said operative position.

2. In a lasting machine for adhesively connecting parts of a shoe, in combination, support means for supporting a last and a material on said last; applicator means having an engaging face formed with an open channel, said channel having at least one constricted portion having a smaller cross-section than another portion of said channel, said other portion of said channel having a cross-section gradually decreasing toward said constricted portion; means mounting said applicator means for movement between an operative position in which said engaging face abuts the material so that said channel is closed by the material, and an inoperative position spaced from said support means and from the material; and means connected to said other portion of said channel for moving an adhesive first through said other portion and then through said constricted portion of said channel in said operative position of said applicator means whereby high pressure develops in said other portion of said channel so that a part of said adhesive adheres to the material when said applicator means is in said operative position.

3. In a lasting machine for adhesively connecting parts of a shoe, in combination, support means for supporting a last and an insole on the bottom face of said last; applicator means having an engaging face having a shape matching the shape of said bottom face and formed with an open channel having an inlet and an outlet spaced along said engaging face; said open channel being shaped to conform to the peripheral contour of the bottom face of the last and of the insole means mounting one of said means for movement toward and away from the respective other means between an operative position in which said engaging face abuts the insole so that said channel is closed by the insole, and an inoperative position in which said engaging face is spaced from said support means and from the insole; means for moving an adhesive through said inlet into said channel in said operative position of said applicator means whereby at least a part of said adhesive adheres to the insole when said applicator means is in said operative position and remains on the same in said inoperative position; and heating means mounted in said applicator means and having heating parts extending along said channel for heating the adhesive in said channel.

4. In a lasting machine as set forth in claim 3, in combination, a means for measuring temperature mounted on said applicator means for measuring the temperature of the same and of the adhesive in said channel; and wherein said heating means are regulable for adjusting the temperature and thereby the viscosity of the adhesive so as to cause adherence of greater or smaller parts of the adhesive in said channel to the insole in accordance with the viscosity of the adhesive.

5. In a lasting machine for adhesively connecting parts of a shoe, in combination, support means for supporting a last and a material on said last; applicator means having an engaging face formed with an open channel having an inlet and an outlet spaced along said engaging face; said applicator means being formed with an inlet passage connected to one end of said channel and with an outlet passage connected to the other end of said channel; means mounting said applicator means for movement between an operative position in which said engaging face abuts the material so that said channel is closed by the material, and an inoperative position in which said engaging face is spaced from said support means and from the material; and pump means for moving an adhesive through said inlet passage and said inlet into said channel, and partly out of said outlet and said outlet passage in said operative position of said applicator means whereby a part of said adhesive adheres to the material when said applicator means is in said operative position and remains on the same in said inoperative position.

6. In a lasting machine for adhesively connecting parts of a shoe, in combination, support means for supporting a last and an insole on the bottom face of said last; applicator means having an engaging face having a shape matching the shape of said bottom face and formed with an open channel, said open channel being shaped to conform to the peripheral contour of the bottom face of the last and of the insole, said applicator means being formed with an inlet passage connected to one end of said channel and with an outlet passage connected to the other end of said channel, said other end of said channel being constricted; means mounting said applicator means for movement between an operative position in which said engaging face abuts the insole so that said channel is closed by the insole, and an inoperative position spaced from said support means and from the insole; pump means for moving an adhesive through said inlet passage, said channel, and said outlet passage in said operative position of said applicator means whereby high pressure develops in said channel and a part of said adhesive adheres to the insole material when said applicator means is in said operative position; and heating means mounted in said applicator means and having heating parts extending along said channel for heating the adhesive in said channel.

7. In a lasting machine for adhesively connecting parts of a shoe, in combination, support means for supporting a last and an insole on the bottom face of the last, said support means abutting the center portions of the insole and of the bottom face of the last; applicator means at least partly surrounding said support means and having an engaging face formed with an open channel including two channel parts located on opposite sides of said support means and being shaped to conform to the contour of the peripheral outlines of said bottom face and of said insole, said channel parts having one pair of ends located at the tip of said bottom face and the other pair of ends transversely spaced from each other, said applicator means being formed with an inlet passage communicating with said one pair of ends, and with a pair of outlet passages communicating, respectively, with the other pair of ends of said channel parts; inlet means communicating with the inlet passage and an outlet means communicating with the outlet passage; means mounting said applicator means for movement between an operative position in which said engaging face abuts the insole so that said channel parts are closed by the insole, and an inoperative position spaced from said support means and from the insole; and means for moving an adhesive through said channel in said operative position of said applicator means and including a pump and conduit means connecting said pump with said inlet means and outlet means, respectively, whereby a part of the adhesive flowing through said channel parts adheres to the insole along the peripheral edges thereof when said applicator means is in said operative position.

8. In a lasting machine for adhesively connecting parts of a shoe, in combination, support means for supporting a last and an insole on the bottom face of the last, said support means abutting the center portions of the insole and of the bottom face of the last; applicator means at least partly surrounding said support means and having an engaging face formed with an open channel including two channel parts located on opposite sides of said support means and being shaped to conform to the contour of the peripheral outlines of said bottom face and of said insole, said channel parts having one pair of ends located at the tip of said bottom face and the other pair of ends transversely spaced from each other, portions of said channel parts in the region of said other ends having smaller cross-sections than the other portions of said channel parts, said applicator means being formed with an inlet passage communicating with said one pair of ends, and with a pair of outlet passages communicating, respectively, with the other pair of ends of said channel parts; inlet means communicating with the inlet passage and an outlet means communicating with the outlet passage; means mounting said applicator means for movement between an operative position in which said engaging face abuts the insole so that said channel parts are closed by the insole, and an inoperative position spaced from said support means and from the insole; and means for moving an adhesive through said channel in said operative position of said applicator means and including a pump and conduit means connecting said pump with said inlet means and outlet means, respectively, whereby high pressure develops in said other portions of said channel parts so that a part of the adhesive flowing through said channel parts adheres to the insole along the peripheral edges thereof when said applicator means is in said operative position.

9. In a lasting machine for adhesively connecting parts of a shoe, in combination, support means for supporting a last and an insole on the bottom face of the last, said support means abutting the center portions of the insole and of the bottom face of the last; applicator means at least partly surrounding said support means and having an engaging face formed with an open channel including two channel parts located on opposite sides of said support means and being shaped to conform to the contour of the peripheral outlines of said bottom face and of said insole, said channel parts having one pair of ends located at the tip of said bottom face and the other pair of ends transversely spaced from each other, said applicator means being formed with an inlet passage communicating with said one pair of ends, and with a pair of outlet passages communicating, respectively, with the other pair of ends of said channel parts; inlet means communicating with the inlet passage and an outlet means communicating with the outlet passage; means mounting said applicator means for movement between an operative position in which said engaging face abuts the insole so that said channel parts are closed by the insole, and an inoperative position spaced from said support means and from the insole; means for moving an adhesive through said channel in said operative position of said applicator means and including a pump and conduit means connecting said pump with said inlet means and outlet means, respectively, whereby a part of the adhesive flowing through said channel parts adheres to the insole along the peripheral edges thereof when said applicator means is in said operative position; and wiper means for wiping the marginal portion of an upper supported on said last over the peripheral edge portion of said insole to which said adhesive adheres while said applicator means is in said inoperative position whereby the upper and the insoles are adhesively connected.

10. In a lasting machine for adhesively connecting parts of a shoe, in combination, support means for supporting a last and an insole on the bottom face of the last, said support means abutting the center portions of the insole and of the bottom face of the last; applicator means at least partly surrounding said support means and having an engaging face formed with an open channel including two channel parts located on opposite sides of said support means and being shaped to conform to the contour of the peripheral outlines of said bottom face and of said insole, said channel parts having one pair of ends located at the tip of said bottom face and the other pair of ends transversely spaced from each other, said applicator means being formed with an inlet passage communicating with said one pair of ends, and with a pair of outlet passages communicating, respectively, with the other pair of ends of said channel parts, said applicator means including an upper applicator part having said engaging face and said open channel on top, and a lower applicator part supporting said upper applicator part, said inlet means and said outlet means, said lower applicator part having a transverse passage, said inlet passage and said outlet passage having upper and lower portions located in said upper and lower applicator parts, respectively, said lower portions of said outlet passages being connected by said transverse passage; means detachably mounting said upper applicator part on said lower applicator part so that said upper applicator part can be exchanged for another upper applicator part adapted for cooperation with a differently shaped last and insole; inlet means communicating with the inlet passage and an outlet means communicating with the outlet passage; means mounting said applicator means for movement between an operative position in which said engaging face abuts the insole so that said channel parts are closed by the insole, and an inoperative position spaced from said support means and from the insole; and means for moving an adhesive through said channel in said operative position of said applicator means and including a pump and conduit means connecting said pump with said inlet means and outlet means, respectively, whereby a part of the adhesive flowing through said channel parts adheres to the insole along the peripheral edges thereof when said applicator means is in said operative position.

11. A lasting machine as set forth in claim 10 wherein said applicator means include a tubular inlet member secured to one of said applicator parts in the inlet passage portion thereof and projecting into said inlet passage portion of the other applicator part, and a pair of tubular outlet members secured to said other applicator part in the outlet passage portions thereof and projecting into said outlet passage portions of said one applicator part whereby said upper and lower portions of said inlet and outlet passage register.

12. In a lasting machine for adhesively connecting parts of a shoe, in combination, support means for supporting a last and an insole on the bottom face of the last, said support means abutting the center portions of the insole and of the bottom face of the last; a rod supporting said support means; applicator means at least partly surrounding said support means and having an engaging face formed with an open channel including two channel parts located on opposite sides of said support means and being shaped to conform to the contour of the peripheral outlines of said bottom face and of said insole, said channel parts having one pair of ends located at the tip of said bottom face and the other pair of ends transversely spaced from each other, said applicator means being formed with an inlet passage communicating with said one pair of ends, and with a pair of outlet passages communicating, respectively, with the other pair of ends of said channel parts; inlet means communicating with the inlet passage and an outlet means communicating with the outlet passage; a bracket mounted on said rod for movement along the same; mounting means for detachably supporting said applicator means on said bracket for movement with said bracket between an operative position in which said engaging face abuts the insole so that said channel parts are closed by the insole, and an inoperative position spaced from said support means and from the insole; and means for moving an adhesive through said channel in said operative position of said applicator means and including a pump and conduit means connecting said pump with said inlet means and outlet means, respectively, whereby a part of the adhesive flowing through said channel parts adheres to the insole along the peripheral edges thereof when said applicator means is in said operative position.

13. A lasting machine as set forth in claim 12 wherein said mounting means include first pivot means for supporting said applicator means for turning movement about an axis transverse to said channel parts and substantially parallel with said engaging face so that the position of said engaging face relative to said bottom face of said last can be adjusted.

14. A lasting machine as set forth in claim 13 wherein said mounting means include a second pivot means supporting said first pivot means and said applicator means for angular movement about an axis substantially perpendicular to said engaging face.

15. A lasting machine as set forth in claim 14 wherein said second pivot means includes a stud removably seated in a recess of said bracket so that said mounting means and applicator means can be together detached from said bracket.

16. In a lasting machine for adhesively connecting parts of a shoe, in combination, support means for supporting a last and an insole on the bottom face of the last, said support means abutting the center portions of the insole and of the bottom face of the last; applicator means at least partly surrounding said support means and having an engaging face formed with an open channel including two channel parts located on opposite sides of said support means and being shaped to conform to the contour of the peripheral outlines of said bottom face and of said insole, said channel parts having one pair of ends located at the tip of said bottom face and the other pair of ends transversely spaced from each other, said applicator means being formed with an inlet passage communicating with said one pair of ends, and with a pair of outlet passages communicating, respectively, with the other pair of ends of said channel parts, said applicator means including an upper applicator part having said engaging face and said open channel on top, and a lower applicator part supporting said upper applicator part, said inlet means and said outlet means, said lower applicator part having a transverse passage, said inlet passage and outlet passage having upper and lower portions located in said upper and lower applicator parts, respectively, said lower portions of said outlet passages being connected by said transverse passage means detachably mounting said upper applicator part on said lower applicator part so that said upper applicator part can be exchanged for another upper applicator part adapted for cooperation with a differently shaped last and insole; inlet means communicating with the inlet passage and an outlet means communicating with the outlet passage; means mounting said applicator means for movement between an operative position in which said engaging face abuts the insole so that said channel parts are closed by the insole, and an inoperative position spaced from said support means and from the insole; heating means in said lower applicator part for heating said lower and upper applicator parts, said channel, said inlet and outlet passages, and said transverse passage; means for moving an adhesive through said channel in said operative position of said applicator means and including a pump and conduit means connecting said pump with said inlet means and outlet means, respectively whereby a part of the adhesive flowing through said channel parts adheres to the insole along the peripheral edges thereof when said applicator means is in said operative position; and wiper means for wiping the marginal portion of an upper supported on said last over the peripheral edge portion of said insole to which said adhesive adheres while said applicator means is in said inoperative position whereby the upper and the insoles are adhesively connected.

17. A lasting machine as set forth in claim 16 and including fluid-operated motor means for moving said applicator means between said positions thereof.

18. In a machine for adhesively connecting parts of a shoe, in combination, support means for supporting a last and a material on said last; applicator means having an engaging face formed with an open channel having an inlet and an outlet spaced along said engaging face; means mounting one of said means for movement toward and away from the respective other means between an operative position in which said engaging face abuts the material so that said open channel is closed by the material, and an inoperative position in which said engaging face is spaced from said support means and from the material; and means for moving an adhesive through said inlet into said channel in said operative position of said applicator means whereby at least a part of said adhesive adheres to the material, and remains on the material in said inoperative position of said applicator means.

19. In a machine for adhesively connecting parts of a shoe, in combination, support means for supporting a last and a material on the last; applicator means having an engaging face formed with an elongated open channel having an inlet at one end and an outlet at the other end; means mounting one of said means for movement toward and away from the respective other means between an operative position in which said engaging face abuts the material so that said channel is closed by the material, and an inoperative position in which said engaging face is spaced from said support means and from the material; and means for moving an adhesive through said inlet into said channel in said operative position of said applicator means whereby at least a part of said adhesive adheres to the material, and remains on the same in said inoperative position of said applicator means.

20. In a machine for adhesively connecting parts of a shoe, in combination, support means for supporting a last and an insole on the bottom face of the last, said bottom face and said insole being bounded by lateral edges and by end edges having the same outline; applicator means having an engaging face bounded by edges having the same outline as said insole and said bottom face, said engaging face of said applicator means being formed with an elongated open channel extending along said edges of said engaging face; means for mounting one of said means for movement toward and away from the other means between an operative position in which said edges of said engaging face abuts said insole along said edges of the same and in which said engaging face abuts the insole so that said channel is closed by said insole, and an inoperative position in which said engaging face is spaced from said insole; and pump means for pumping an adhesive into said closed channel in said operative position whereby at least a part of said adhesive adheres to the insole and remains on the same in said inoperative position.

21. In a machine for adhesively connecting part of a shoe, in combination, support means for supporting a last and a material on the last; applicator means having an engaging face formed with an open channel having an inlet and a constricted outlet spaced along said engaging face from said inlet; means mounting one of said means for movement toward and away from the other means between an operative position in which said engaging face abuts the material so that said channel is closed by the material, and an inoperative position in which said engaging face is spaced from said support means and from the material; and means connected to said inlet for pumping an adhesive through said inlet into said channel so that due to said constricted outlet high pressure develops in said channel whereby at least a part of said adhesive in said channel adheres to the material and remains on the same in said inoperative position.

22. In a machine for adhesively connecting parts of a shoe, in combination, support means for supporting a last and a material on said last; applicator means including a first applicator part having an engaging face formed with an open channel having an inlet and an outlet spaced along said engaging face, a second applicator part formed with inlet and outlet passages respectively communicating with said inlet and outlet, inlet and outlet means on the second applicator part communicating with said inlet and outlet passages, means detachably mounting said first applicator part on said second applicator part so that said first applicator part can be exchanged for another first applicator part adapted for cooperation with a differently shaped last; means for moving said applicator means and said support means with said last and material relative to each other between an operative position in which said engaging face abuts the material whereby said open channel is closed by the material, and an inoperative position in which said engaging face is spaced from said supporting means and from the material; pump means; and conduit means connecting said pump means with said inlet means whereby the adhesive is pumped through said inlet passage and said inlet and along said engaging face and said material into said closed channel in said operative position whereby at least a part of said adhesive adheres to the material and remains on the same in said inoperative position.

23. A machine as set forth in claim 22 and including heating means mounted in said second applicator part and extending along said channel in said first applicator part.

24. A machine as set forth in claim 23 and including means for measuring temperature mounted on said second applicator portion in the region of said channel for measuring the temperature in the region of said channel and thereby the temperature of the adhesive in the same; and wherein said heating means are regulatable for adjusting the temperature and thereby the viscosity of the adhesive in accordance with the indications of said means for measuring temperature whereby greater or smaller parts of the adhesive in said channel adhere to the material depending on the viscosity of the adhesive.

References Cited by the Examiner

UNITED STATES PATENTS

| 2,309,981 | 2/1943 | Randall | 118—410 |
| 2,969,555 | 1/1961 | Kamborian | 12—145 |
| 3,035,287 | 5/1962 | Vlcek | 12—12.4 |
| 3,039,121 | 6/1962 | Weinschenk | 12—10.1 |

FRANK J. COHEN, *Primary Examiner.*

JORDAN FRANKLIN, *Examiner.*

P. D. LAWSON, *Assistant Examiner.*